(12) United States Patent
Yamamoto et al.

(10) Patent No.: US 10,005,019 B2
(45) Date of Patent: Jun. 26, 2018

(54) CARBON DIOXIDE CONCENTRATION-CONTROLLING DEVICE AND ELECTRONIC APPARATUS

(71) Applicant: Sharp Kabushiki Kaisha, Osaka (JP)

(72) Inventors: Masaki Yamamoto, Osaka (JP);
Takayuki Naka, Osaka (JP); Hirohisa Yamada, Osaka (JP); Hideharu Tajima, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 75 days.

(21) Appl. No.: 15/109,905

(22) PCT Filed: Nov. 11, 2014

(86) PCT No.: PCT/JP2014/079843
§ 371 (c)(1),
(2) Date: Jul. 6, 2016

(87) PCT Pub. No.: WO2015/125355
PCT Pub. Date: Aug. 27, 2015

(65) Prior Publication Data
US 2016/0354722 A1   Dec. 8, 2016

(30) Foreign Application Priority Data

Feb. 21, 2014 (JP) ................................ 2014-032131
May 30, 2014 (JP) ................................ 2014-113456

(51) Int. Cl.
*B01D 53/02* (2006.01)
*B01D 53/04* (2006.01)
(Continued)

(52) U.S. Cl.
CPC ......... *B01D 53/0454* (2013.01); *B01D 53/04* (2013.01); *B01J 20/041* (2013.01);
(Continued)

(58) Field of Classification Search
CPC ...... B01D 2253/1124; B01D 2257/504; B01D 2257/80; B01D 2258/06;
(Continued)

(56) References Cited

U.S. PATENT DOCUMENTS

| 4,830,639 | A | * | 5/1989 | Grunewald | ........ | B01D 53/1425 |
| | | | | | | 95/163 |
| 6,783,738 | B1 | * | 8/2004 | Sasaki | ................ | B01D 53/06 |
| | | | | | | 422/171 |

(Continued)

FOREIGN PATENT DOCUMENTS

| JP | S61227822 A | 10/1986 |
| JP | 03-078563 U | 8/1991 |

(Continued)

OTHER PUBLICATIONS

Translation of JP2010-243104, Akeyama, Oct. 2010.*

(Continued)

*Primary Examiner* — Christopher P Jones
(74) *Attorney, Agent, or Firm* — ScienBiziP, P.C.

(57) ABSTRACT

A carbon dioxide concentration-controlling device (1 or 100) of the present invention controls the carbon dioxide absorption rate of a carbon dioxide-absorbing material (30) in accordance with a carbon dioxide concentration detected by a detector (20). A state determining unit (11) determines a state of the carbon dioxide-absorbing material (30), and a state controlling unit (12) controls the state of the carbon dioxide-absorbing material (30) to the state determined by the state determining unit (11).

10 Claims, 8 Drawing Sheets

(51) Int. Cl.
*B01J 20/10* (2006.01)
*B01J 20/04* (2006.01)
*B01J 20/06* (2006.01)
*B01J 20/30* (2006.01)
*F24F 3/14* (2006.01)
*F24F 3/16* (2006.01)
*F24F 110/70* (2018.01)

(52) U.S. Cl.
CPC ............... *B01J 20/06* (2013.01); *B01J 20/10* (2013.01); *B01J 20/3078* (2013.01); *F24F 3/14* (2013.01); *F24F 3/16* (2013.01); *B01D 2253/1124* (2013.01); *B01D 2257/504* (2013.01); *B01D 2257/80* (2013.01); *B01D 2258/06* (2013.01); *B01D 2259/40098* (2013.01); *B01D 2259/4508* (2013.01); *F24F 2110/70* (2018.01); *Y02B 30/78* (2013.01); *Y02C 10/06* (2013.01); *Y02C 10/08* (2013.01)

(58) Field of Classification Search
CPC .. B01D 2259/40098; B01D 2259/4508; B01D 53/04; B01D 53/0454; B01D 20/041; B01D 20/06; B01D 20/10; B01D 20/3078; F24F 2011/0026; F24F 3/14; F24F 3/16; Y02C 10/06; Y02C 10/08
See application file for complete search history.

(56) References Cited

U.S. PATENT DOCUMENTS

| | | | | |
|---|---|---|---|---|
| 2002/0194990 | A1* | 12/2002 | Wegeng | B01D 53/06 95/114 |
| 2003/0015093 | A1* | 1/2003 | Wegeng | B01D 53/0407 95/114 |
| 2004/0023086 | A1* | 2/2004 | Su | C01B 3/38 429/410 |
| 2006/0037478 | A1* | 2/2006 | Mori | B01D 53/02 96/108 |
| 2006/0144227 | A1* | 7/2006 | White | B01D 53/02 95/139 |
| 2006/0230930 | A1* | 10/2006 | Knaebel | B01D 53/0462 95/96 |
| 2010/0319531 | A1* | 12/2010 | Iijima | B01D 53/1412 95/11 |
| 2011/0265648 | A1* | 11/2011 | Meirav | F24F 3/0442 95/227 |
| 2011/0296872 | A1* | 12/2011 | Eisenberger | B01D 53/04 62/640 |
| 2012/0048111 | A1* | 3/2012 | Nakao | B01D 53/62 95/139 |
| 2012/0067219 | A1* | 3/2012 | Ogawa | B01D 53/1412 95/178 |
| 2012/0235087 | A1* | 9/2012 | Handagama | B01D 53/1425 252/190 |
| 2012/0324931 | A1* | 12/2012 | Alden | F25B 27/00 62/157 |
| 2013/0283842 | A1* | 10/2013 | Heyse | B01D 53/0438 62/324.2 |
| 2014/0076165 | A1* | 3/2014 | Nakayama | B01D 53/62 96/181 |

FOREIGN PATENT DOCUMENTS

| | | |
|---|---|---|
| JP | 2001-317780 A | 11/2001 |
| JP | 2006-103974 A | 4/2006 |
| JP | 2010-032092 A | 2/2010 |
| JP | 2010-243104 A | 10/2010 |

OTHER PUBLICATIONS

International Search Report of PCT/JP2014/079843 dated Dec. 9, 2014.
Shigeniwa et al, "Study of Carbon Dioxide Collection Process Using Ceramics Absorbing Material", The Society of Chemical Engineers, Japan (SCEJ) Lecture Proceedings, Aug. 18, 2003, SCEJ 36th Autumn Meeting, Session ID: G3A02.

* cited by examiner

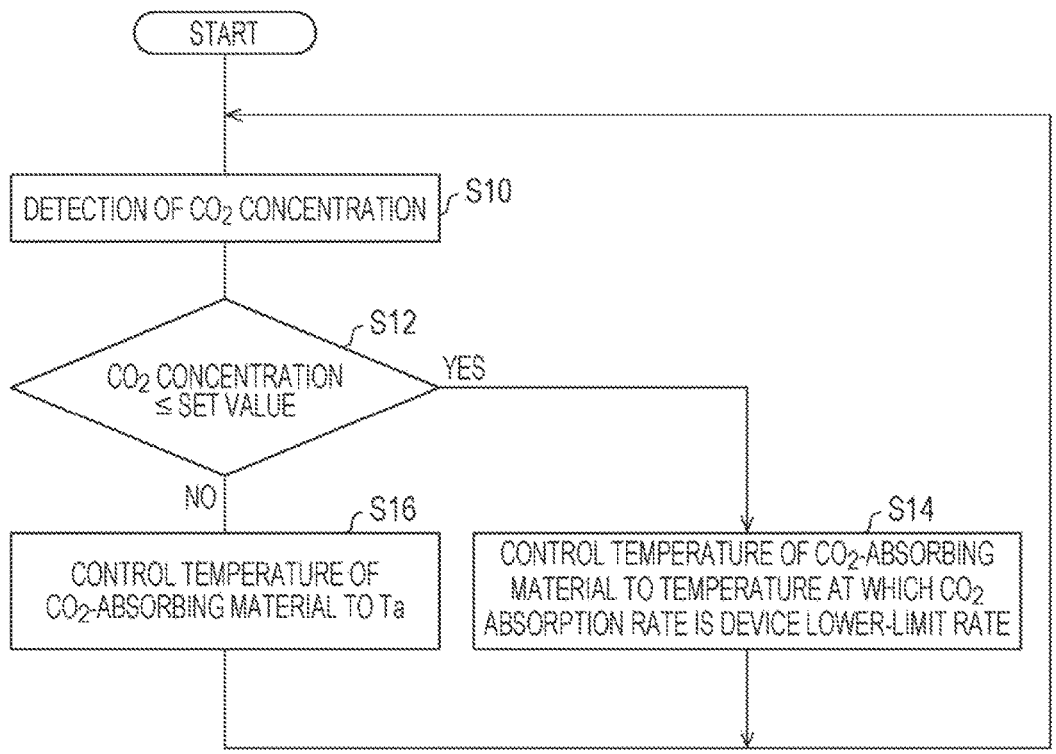

CARBON DIOXIDE CONCENTRATION-CONTROLLING DEVICE AND ELECTRONIC APPARATUS

TECHNICAL FIELD

The present invention relates to a carbon dioxide concentration-controlling device that controls a carbon dioxide concentration.

BACKGROUND ART

In recent years, because of efficient use of air conditioners due to a rise of awareness about environmental pollution and power saving, there has been an increasing need for limiting ventilation inside a room. When ventilation is limited in such a space where ventilation can be limited, the carbon dioxide concentration in the air increases because of carbon dioxide ($CO_2$) contained in, for example, exhalations of human beings. When the carbon dioxide concentration in the air reaches a particular concentration or higher, carbon dioxide may adversely affect a human body. Therefore, a technique for removing carbon dioxide in the air has been developed in order to prevent an increase in the carbon dioxide concentration.

For example, PTL 1 discloses a technique for removing carbon dioxide in the air through adsorption by using an adsorbent to which an amine-based organic substance is caused to adhere. PTL 2 discloses a technique for removing carbonic acid gas in the air through adsorption by using activated carbon.

CITATION LIST

Patent Literature

PTL 1: Japanese Examined Patent Application Publication No. 3-39729 (Publication date: Jun. 14, 1991)
PTL 2: Japanese Unexamined Patent Application Publication No. 2001-317780 (Publication date: Nov. 16, 2001)

SUMMARY OF INVENTION

Technical Problem

In the above related art, however, it is impossible or difficult to control the amount of carbon dioxide absorbed, which makes it difficult to control the carbon dioxide concentration in the air to an appropriate value.

Specifically, when the adsorbent disclosed in PTL 1 or the activated carbon disclosed in PTL 2 is used as a carbon dioxide-absorbing material, the amount (absorption rate) of carbon dioxide absorbed per unit time by the absorbing material itself cannot be controlled. Therefore, even when the carbon dioxide concentration in the space is an appropriate value, carbon dioxide may be unnecessarily absorbed.

In view of the foregoing, it is an object of the present invention to realize a carbon dioxide concentration-controlling device capable of controlling a carbon dioxide concentration in the air to an appropriate value.

Solution to Problem

To solve the above problem, a carbon dioxide concentration-controlling device according to an aspect of the present invention includes a detector configured to detect a carbon dioxide concentration in air, an absorbing material which absorbs carbon dioxide contained in the air and whose carbon dioxide absorption rate is controllable, and an absorption rate controller configured to control the absorption rate of the absorbing material in accordance with a carbon dioxide concentration detected by the detector.

Advantageous Effects of Invention

According to an aspect of the present invention, an effect of controlling a carbon dioxide concentration in the air to an appropriate value is produced.

BRIEF DESCRIPTION OF DRAWINGS

FIG. 3 is a flowchart illustrating an example of a process of the carbon dioxide concentration-controlling device.

FIG. 4 is a table illustrating the relationship between a carbon dioxide concentration in the air, a set value, and a temperature of a carbon dioxide-absorbing material in a carbon dioxide concentration-controlling device according to a second embodiment of the present invention.

DESCRIPTION OF EMBODIMENTS

First Embodiment

A first embodiment according to the present invention will be described below. First, the configuration of a carbon dioxide concentration-controlling device 1 (carbon dioxide concentration-controlling device) according to this embodiment will be described with reference to FIG. 1.

<<Configuration of Principal Parts>>

Figure 1:
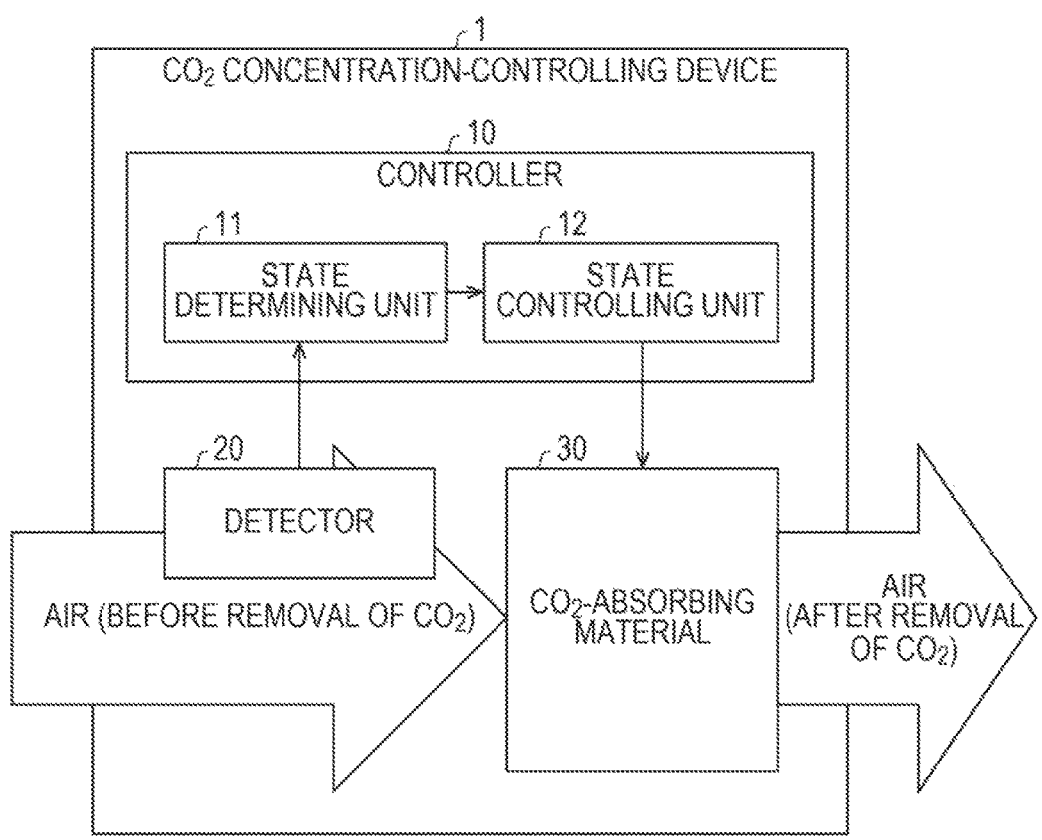
FIG. 1 is a block diagram illustrating a configuration of principal parts of a carbon dioxide concentration-controlling device according to a first embodiment of the present invention.

FIG. 1 is a block diagram illustrating a configuration of principal parts of the carbon dioxide concentration-controlling device 1. The arrows in the drawing indicate a flow of air. The carbon dioxide concentration-controlling device 1 is configured to control the concentration (carbon dioxide concentration) of carbon dioxide contained in the air in a predetermined space (hereafter, simply referred to as "air"). The carbon dioxide concentration-controlling device 1 takes in air, removes (absorbs) carbon dioxide in an amount corresponding to a carbon dioxide concentration in the air, and then discharges, to the outside of the device, the air from which the carbon dioxide has been removed.

The carbon dioxide concentration-controlling device 1 desirably includes a mechanism (not illustrated) that takes in air, such as a fan. When the carbon dioxide concentration-controlling device 1 includes, for example, a fan, the air can be more quickly and efficiently sent to a carbon dioxide-absorbing material 30 described below. Furthermore, the air from which carbon dioxide has been absorbed by the carbon dioxide-absorbing material 30 can be more quickly and efficiently discharged to the outside of the carbon dioxide concentration-controlling device 1. In other words, the air in a space can be more efficiently circulated. Thus, the carbon dioxide concentration-controlling device 1 is capable of minutely controlling the carbon dioxide concentration in the space.

Herein, the predetermined space may be any space as long as air is present. Examples of the space include living spaces in residences, working spaces in plants and offices, and spaces in vehicles such as automobiles and trains.

The predetermined space is particularly desirably a space where ventilation can be limited. Herein, the phrase "space where ventilation can be limited" refers to a closed space or an indoor space, room space, or vehicle space where ventilation can be limited. Alternatively, the phrase "space where ventilation can be limited" also refers to a space where voluntary ventilation (e.g., opening a window, operating a ventilating fan, operating a ventilating device, and operating a device such as a vacuum device that reduces the pressure of a room to a negative pressure) can be limited or prohibited.

(Details of Carbon Dioxide Concentration-Controlling Device 1)

More specifically, the carbon dioxide concentration-controlling device 1 includes a detector 20, a controller 10 (absorption rate controller), and a carbon dioxide-absorbing material 30 (absorbing material).

The detector 20 is configured to detect, at predetermined time intervals, the carbon dioxide concentration in the air (the air before removal of $CO_2$) that has been taken into the carbon dioxide concentration-controlling device 1 and send the carbon dioxide concentration to a state determining unit 11. The detection method is not particularly limited, but is, for example, a semiconductor detection method, an electrochemical detection method, or an infrared absorption detection method.

When the carbon dioxide concentration is detected by a semiconductor detection method, an n-type semiconductor such as $SnO_2$ or $ZnO$ can be used as the semiconductor. Among them, a semiconductor obtained by adding La to $SnO_2$ is excellent in terms of selectivity of carbon dioxide. Therefore, when the carbon dioxide concentration is detected by a semiconductor detection method in the present invention, a semiconductor obtained by adding lanthanum (La) to $SnO_2$ is more desirably used. When the carbon dioxide concentration is detected by an electrochemical detection method, the type of conductive ion of a solid electrolyte may be, for example, a sodium ion.

Among the above detection methods, the semiconductor detection method has advantages in that the cost is low and the detection accuracy of carbon dioxide is not easily affected by the environmental conditions, and thus the carbon dioxide concentration can be detected even in a severe environment. The electrochemical detection method and the infrared absorption detection method have high detection sensitivity of carbon dioxide and thus have an advantage of excellent selectivity of carbon dioxide.

The detector 20 may detect the carbon dioxide concentration in the air (the air after removal of $CO_2$) after the carbon dioxide-absorbing material 30 described below has absorbed carbon dioxide.

The carbon dioxide-absorbing material ($CO_2$-absorbing material) 30 is configured to absorb carbon dioxide in the air. The carbon dioxide-absorbing material 30 is not particularly limited as long as the absorbing material can variably control the absorption amount of carbon dioxide. Specifically, the carbon dioxide-absorbing material 30 is desirably an absorbing material in which the amount of carbon dioxide that can be absorbed per unit time (carbon dioxide absorption amount per unit time, $CO_2$ absorption rate) changes with the state of the absorbing material. The carbon dioxide-absorbing material 30 is more preferably an absorbing material whose $CO_2$ absorption rate is controllable from substantially zero (a low absorption rate at which even when carbon dioxide is absorbed at the rate, the carbon dioxide concentration in the space is not affected).

Herein, the phrase "change with the state of the absorbing material" more specifically refers to a temperature change in the carbon dioxide-absorbing material 30. That is, the carbon dioxide-absorbing material 30 is desirably a material whose $CO_2$ absorption rate changes in accordance with the temperature change in the carbon dioxide-absorbing material 30. The temperature of the carbon dioxide-absorbing material 30 is a parameter that can be relatively easily and accurately measured and controlled. Therefore, the $CO_2$ absorption rate can be easily and accurately controlled by using the carbon dioxide-absorbing material 30 whose $CO_2$ absorption rate is controllable with temperature.

The carbon dioxide-absorbing material 30 is also desirably an absorbing material capable of selectively absorbing only carbon dioxide. In the related art, there is a technique for separating carbon dioxide with a $CO_2/O_2$ selection film and absorbing the separated carbon dioxide with an absorbing material. However, the $CO_2/O_2$ selection film has no selectivity for substances which are other than carbon dioxide and oxygen and are present in the air in a large amount, such as nitrogen. Therefore, when the separation of carbon dioxide is performed, nitrogen is contained in the separated gas in an amount much larger than that of carbon dioxide. Consequently, in the case where ventilation is limited in a space where ventilation can be limited, if the separation and removal of carbon dioxide is continuously performed, the air pressure in the space may considerably decrease. Therefore, even if such a $CO_2/O_2$ selection film is used as in the related art, it is difficult to keep carbon dioxide in the space at a constant concentration for a long time.

In contrast, in the present invention, when the absorbing material capable of selectively absorbing only carbon dioxide is used as the carbon dioxide-absorbing material 30, only carbon dioxide can be efficiently absorbed without absorbing such a substance contained in the air in a large amount. This provides advantages in that the above-described considerable change in air pressure in the space does not occur and the absorptivity of carbon dioxide does not easily degrade.

Examples of the absorbing material whose $CO_2$ absorption rate is controllable with temperature and which can selectively absorb carbon dioxide include lithium composite oxides such as $Li_2ZrO_3$, $LiFeO_2$, $LiNiO_2$, $Li_2TiO_3$, $Li_2SiO_3$, and $Li_4SiO_4$. The following description will be made as an example for the case where the lithium composite oxide is used as the carbon dioxide-absorbing material 30, and the $CO_2$ absorption rate of the lithium composite oxide is controlled by controlling the temperature of the lithium composite oxide.

The controller 10 controls the carbon dioxide concentration-controlling device 1 in a centralized manner. The controller 10 includes a state determining unit 11 and a state controlling unit 12. The controller 10 may instruct the detector 20 to detect the carbon dioxide concentration at predetermined time intervals.

The state determining unit 11 determines the state (temperature) of the carbon dioxide-absorbing material 30 in accordance with whether the carbon dioxide concentration is a set value (first threshold) or lower. Specifically, the state determining unit 11 may be realized by using, for example, a logic circuit (hardware) formed on an integrated circuit (IC chip) or the like or software that uses a CPU (central processing unit).

As described above, this description is made as an example for the case where the $CO_2$ absorption rate of the lithium composite oxide is controlled by controlling the temperature of the lithium composite oxide serving as the carbon dioxide-absorbing material 30. In this case, the state determining unit 11 determines the temperature of the carbon dioxide-absorbing material 30 (lithium composite oxide) in accordance with the carbon dioxide concentration received from the detector 20. The determination of the temperature by the state determining unit 11 will be described below.

Upon receiving the carbon dioxide concentration in the air from the detector 20, the state determining unit 11 determines whether the carbon dioxide concentration is lower than or equal to the set value. When the carbon dioxide concentration in the air is lower than or equal to the set value, the state determining unit 11 determines the temperature of the carbon dioxide-absorbing material 30 to be a temperature at which the $CO_2$ absorption rate of the absorbing material is a lower-limit rate settable in the carbon dioxide concentration-controlling device 1. When the carbon dioxide concentration in the air is higher than the set value, the state determining unit 11 determines the temperature of the carbon dioxide-absorbing material 30 to be a temperature at which the $CO_2$ absorption rate of the absorbing material is higher than the lower-limit rate. The state controlling unit 12 is notified of the determined temperature of the carbon dioxide-absorbing material 30.

Herein, the phrase "lower-limit rate settable in the carbon dioxide concentration-controlling device 1" refers to a substantially minimum $CO_2$ absorption rate which is at least lower than the maximum $CO_2$ absorption rate and which is settable in the carbon dioxide concentration-controlling device. Hereafter, the "lower-limit rate settable in the carbon dioxide concentration-controlling device 1" is simply referred to as a "device lower-limit rate". The "device lower-limit rate" may be, for example, a minimum $CO_2$ absorption rate of the carbon dioxide-absorbing material 30 in a range of temperatures the state controlling unit 12 can control.

Although described in detail below, for example, the carbon dioxide-absorbing material 30 exhibits the above-mentioned "substantially minimum" $CO_2$ absorption rate when the temperature of the carbon dioxide-absorbing material 30 is within a predetermined range. At the "device lower-limit rate", the temperature of the carbon dioxide-absorbing material 30 may be a temperature that is within the predetermined range and is close to a temperature at which the $CO_2$ absorption rate is maximized. This allows a decrease in the difference in temperature of the carbon dioxide-absorbing material 30 controlled in accordance with whether the carbon dioxide concentration is lower than or equal to the set value, which produces an effect of quickly changing the $CO_2$ absorption rate of the carbon dioxide-absorbing material 30.

Alternatively, the "device lower-limit rate" may be a $CO_2$ absorption rate of the absorbing material at a temperature (e.g., room temperature) provided while energy (e.g., heat) is not supplied to the absorbing material 30 using external means (e.g., heater). This produces an economical effect without consuming an excess electric power. The "device lower-limit rate" is preferably a rate (substantially zero) which is 0 or more and does not affect the carbon dioxide concentration in the space even when carbon dioxide is absorbed at that rate. That is, at the device lower-limit rate, the absorption of carbon dioxide is preferably substantially stopped.

The term "set value" used herein refers to an upper-limit value of a carbon dioxide concentration which is believed to be appropriate in the air in the space. In general, the carbon dioxide concentration is about 400 ppm in the outside air. However, for example, when ventilation is limited in a space where ventilation can be limited, the activity of living things such as human beings, that is, the breathing of living things increases the carbon dioxide concentration in the air. It is known that when the carbon dioxide concentration in the air exceeds 1000 ppm, people feel sleepy and the concentration decreases. It is also known that when the carbon dioxide concentration in the air is increased to 1000 ppm or more, the damage to health increases with an increase in the carbon dioxide concentration. Thus, the set value may be, for example, 1000 ppm at which people feel sleepy and the concentration decreases and which is specified as a criteria value of Law for Maintenance of Sanitation in Buildings or the like. The set value may be a value set before product shipment or may be a value that can be freely set and changed by a user of the carbon dioxide concentration-controlling device 1.

The state controlling unit 12 controls the state of the carbon dioxide-absorbing material 30 to a state determined by the state determining unit 11. When the state determining unit 11 determines the temperature of the carbon dioxide-absorbing material 30 as described above, the state controlling unit 12 controls the temperature of the carbon dioxide-absorbing material 30 to a value determined by the state determining unit 11.

Examples of the method for controlling the temperature include heating with a heater and temperature control with a Peltier element. When a heater or a Peltier element, which is relatively inexpensive, is used as the state controlling unit 12, the production cost of the carbon dioxide concentration-controlling device 1 can be reduced. Furthermore, a temperature sensor for measuring the temperature of the carbon dioxide-absorbing material 30 is disposed near the carbon dioxide-absorbing material 30, and the temperature sensor is connected to the state controlling unit 12 so as to be capable of communicating with the state controlling unit 12.

In the above example, the state of the carbon dioxide-absorbing material 30 itself is controlled by using the state determining unit 11 and the state controlling unit 12. However, the state determining unit 11 may determine an ambient environment (a value concerning the environment: e.g., ambient temperature of the carbon dioxide-absorbing material 30) of the carbon dioxide-absorbing material 30. Furthermore, the state controlling unit 12 may also control an ambient environment of the carbon dioxide-absorbing material 30 without controlling the state of the carbon dioxide-absorbing material 30. For example, the state determining unit 11 may determine the temperature inside a filling tank containing the carbon dioxide-absorbing material 30, and the state controlling unit 12 may indirectly control the temperature of the carbon dioxide-absorbing material 30 by heating or cooling the filling tank.

As described above, the state controlling unit 12 controls the carbon dioxide absorptivity ($CO_2$ absorption rate) of the carbon dioxide-absorbing material 30 by controlling the state of the carbon dioxide-absorbing material 30 itself or the ambient environment of the carbon dioxide-absorbing material 30.

<<Temperature of Lithium Composite Oxide and Carbon Dioxide Absorption Rate>>

Herein, the temperature determination by the state determining unit 11 and the temperature control by the state controlling unit 12 will be described in detail. First, a change in the $CO_2$ absorption rate of the lithium composite oxide with the temperature of the lithium composite oxide will be described with reference to FIG. 2.

Figure 2:
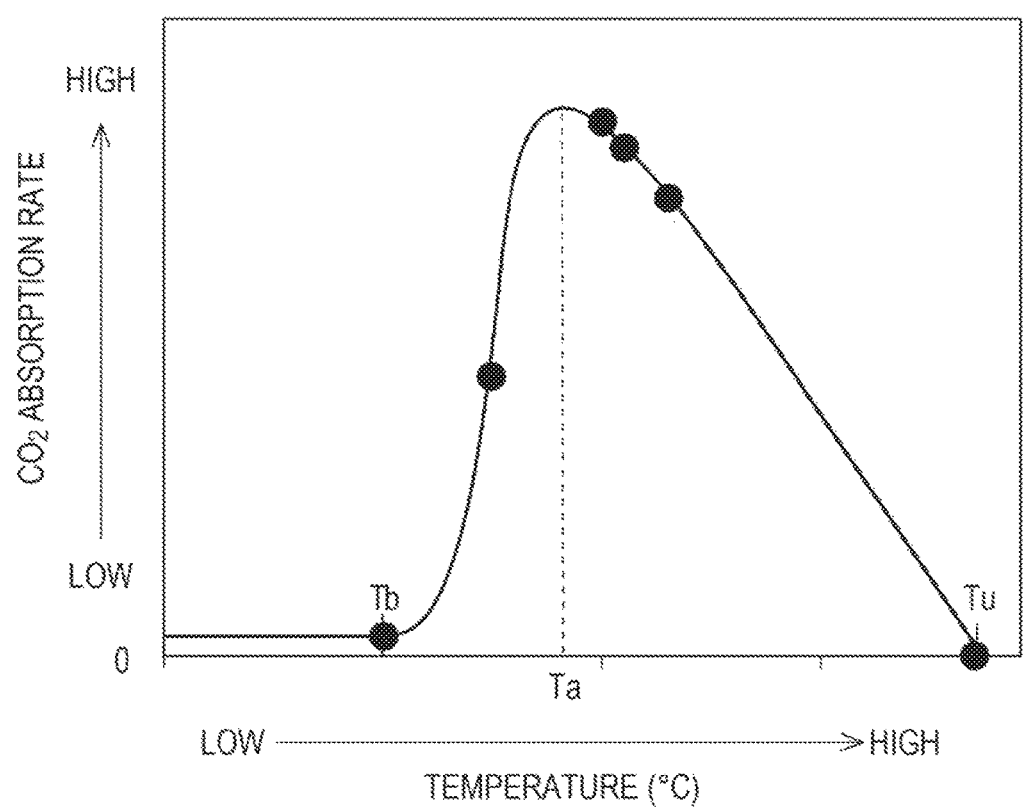
FIG. 2 is a graph illustrating the relationship between an absorption rate of carbon dioxide per unit time and a temperature in a lithium composite oxide.

FIG. 2 is a graph illustrating an example of the relationship between the temperature of the lithium composite oxide (carbon dioxide-absorbing material 30) and the $CO_2$ absorption rate. Herein, the temperature of the lithium composite oxide at which the $CO_2$ absorption rate of the lithium composite oxide is maximized is defined as Ta. Note that Ta is at least higher than room temperature.

The $CO_2$ absorption rate of the lithium composite oxide illustrated in FIG. 2 substantially does not change up to the temperature Tb (substantially minimum $CO_2$ absorption rate). The $CO_2$ absorption rate of the lithium composite oxide increases as the temperature increases from the temperature Tb to Ta. The $CO_2$ absorption rate decreases as the temperature increases from the temperature Ta. At the temperature Tu, the $CO_2$ absorption rate reaches the substantially minimum $CO_2$ absorption rate again. The lithium composite oxide is a carbon dioxide-absorbing material whose $CO_2$ absorption rate is controllable with its temperature.

Next, the temperature determination by the state determining unit 11 and the temperature control by the state controlling unit 12 that use the correlation between temperature and $CO_2$ absorption rate of the lithium composite oxide will be described.

When the carbon dioxide concentration detected by the detector 20 is higher than the set value, it is assumed that excess carbon dioxide (carbon dioxide in an amount that causes the damage to health) is contained in the air. In this case, the state determining unit 11 determines the temperature of the lithium composite oxide to be a temperature (e.g., a temperature higher than Tb and lower than or equal to Tu) at which the $CO_2$ absorption rate is higher than the device lower-limit rate. The state controlling unit 12 controls the temperature of the lithium composite oxide to the temperature determined by the state determining unit 11. As a result of the temperature control, the lithium composite oxide absorbs carbon dioxide at a rate higher than the device lower-limit rate. Hereafter, the phrase "lithium composite oxide (carbon dioxide-absorbing material 30) absorbs carbon dioxide at a rate higher than the device lower-limit rate" (i.e., absorption of carbon dioxide is substantially started) is simply referred to as "carbon dioxide is absorbed".

Herein, when the carbon dioxide concentration detected by the detector 20 is higher than the set value, the state determining unit 11 desirably determines the temperature of the lithium composite oxide to be Ta. In this case, the $CO_2$ absorption rate of the lithium composite oxide is maximized.

Therefore, the carbon dioxide concentration-controlling device 1 is capable of absorbing the largest amount of carbon dioxide while the air taken into the device passes through the carbon dioxide-absorbing material 30. This provides an advantage in that the carbon dioxide concentration-controlling device 1 is capable of more quickly decreasing the carbon dioxide concentration in the space.

Alternatively, when the carbon dioxide concentration detected by the detector 20 is higher than the set value, the state determining unit 11 may determine the temperature of the lithium composite oxide to be a temperature higher than Tb and lower than Ta. In this case, an electric power for controlling (increasing) the temperature of the lithium composite oxide in the state controlling unit 12 can be reduced. That is, this provides an advantage in that energy saving of the carbon dioxide concentration-controlling device 1 can be achieved.

Moreover, a lithium composite oxide containing $Li_4SiO_4$ as a main component is more preferably used as the carbon dioxide-absorbing material 30. Herein, the "main component" refers to a substance having the highest content among substances contained in the lithium composite oxide, such as a substance having a content of 50% or more. In this case, the carbon dioxide absorptivity (absorption rate) of $Li_4SiO_4$ is better than that of other materials (e.g., an aqueous solution with monoethanolamine which is an amine-based organic substance or $Li_2ZrO_3$) at least in the carbon dioxide concentration (e.g., 400 to 1000 ppm) at which living things such as human beings are active. This produces an effect of absorbing a larger amount of carbon dioxide within a shorter time.

When the carbon dioxide concentration detected by the detector 20 is lower than or equal to the set value, it is assumed that the carbon dioxide concentration in the air is at a level that does not cause the damage to health. In this case, the state determining unit 11 determines the temperature of the lithium composite oxide to be a temperature (e.g., a predetermined temperature lower than or equal to Tb) at which the $CO_2$ absorption rate is the device lower-limit rate. The state controlling unit 12 controls the temperature of the lithium composite oxide to the temperature determined by the state determining unit 11. As a result of the temperature control, the lithium composite oxide does not absorb carbon dioxide from the air as much as possible.

Herein, when the carbon dioxide concentration detected by the detector 20 is lower than or equal to the set value, the state determining unit 11 may determine the temperature of the lithium composite oxide to be room temperature. In this case, it is sufficient that the state controlling unit 12 simply dissipates heat from the lithium composite oxide. This provides an advantage in that an electric power is not required to control the temperature.

Alternatively, when the carbon dioxide concentration detected by the detector 20 is lower than or equal to the set value, the state determining unit 11 may determine the temperature of the lithium composite oxide to be a temperature (e.g., Tb) which is close to Ta and at which the $CO_2$ absorption rate is the device lower-limit rate. In this case, the temperature of the lithium composite oxide is kept at a temperature close to Ta even when carbon dioxide is not absorbed. Therefore, when the carbon dioxide concentration in the air changes and carbon dioxide needs to be absorbed, the temperature of the lithium composite oxide is more quickly increased and carbon dioxide can be more quickly absorbed.

As described above, the state determining unit 11 and the state controlling unit 12 control the temperature of the lithium composite oxide in accordance with the carbon dioxide concentration detected by the detector 20. Thus, the carbon dioxide concentration-controlling device 1 is capable of controlling the $CO_2$ absorption rate of the lithium composite oxide in accordance with the carbon dioxide concentration. Consequently, the lithium composite oxide is capable of absorbing carbon dioxide at an appropriate absorption rate corresponding to the carbon dioxide concentration in the air. Therefore, unnecessary absorption of carbon dioxide can be prevented in the carbon dioxide concentration-controlling device 1, and the carbon dioxide concentration in the air can be appropriately kept.

<<Flow of Carbon Dioxide Concentration Control Process>>

Finally, a process for controlling the carbon dioxide concentration in the space by the carbon dioxide concentration-controlling device 1 will be described using an example. FIG. 3 is a flowchart illustrating an example of a control process performed by the carbon dioxide concentration-controlling device 1.

When the carbon dioxide concentration-controlling device 1 is started up (the device is switched on or the control function for carbon dioxide concentration is activated), the carbon dioxide concentration-controlling device 1 takes in air. In the carbon dioxide concentration-controlling device 1, a part or the entirety of the taken air is caused to pass through the detector 20 and then sent to the lithium composite oxide (carbon dioxide-absorbing material 30). When the taken air passes through the lithium composite oxide, carbon dioxide in the air is absorbed at a $CO_2$ absorption rate of the lithium composite oxide.

While the carbon dioxide concentration-controlling device 1 is operated, the detector 20 detects the carbon dioxide concentration in a part or the entirety of the taken air at predetermined time intervals (S10). The information that shows the detected carbon dioxide concentration is sent to the state determining unit 11. The state determining unit 11 determines whether the carbon dioxide concentration detected by the detector 20 is lower than or equal to the set value (S12).

When the carbon dioxide concentration detected by the detector 20 is lower than or equal to the set value (YES in S12), the state determining unit 11 determines the temperature of the lithium composite oxide to be a temperature (e.g., room temperature) at which the $CO_2$ absorption rate is the device lower-limit rate. The state controlling unit 12 controls the temperature of the lithium composite oxide to the temperature determined by the state determining unit 11 (S14). Thus, the $CO_2$ absorption rate of the lithium composite oxide reaches the device lower-limit rate. In other words, a variation in the carbon dioxide concentration in the air is minimized.

When the carbon dioxide concentration detected by the detector 20 is higher than the set value (NO in S12), the state determining unit 11 determines the temperature of the carbon dioxide-absorbing material to be Ta. The state controlling unit 12 controls the temperature of the lithium composite oxide to Ta (S16). Thus, the lithium composite oxide is capable of absorbing carbon dioxide in an amount corresponding to the temperature Ta.

The processes in S12 to S16 are performed each time the detector 20 detects the carbon dioxide concentration and are repeatedly performed until the carbon dioxide concentration-controlling device 1 is stopped (the device is switched off or the control function for carbon dioxide concentration is deactivated). The carbon dioxide concentration-controlling device 1 takes in air and discharges the air to the space while repeatedly performing the process control, whereby the $CO_2$ absorption rate of the device is controlled so that the carbon dioxide concentration in the space reaches the set value.

In the above processes, the carbon dioxide concentration-controlling device 1 is capable of controlling the $CO_2$ absorption rate of the carbon dioxide-absorbing material 30 (lithium composite oxide) itself in accordance with the carbon dioxide concentration in the air. Consequently, the carbon dioxide-absorbing material 30 can be caused to absorb carbon dioxide in an appropriate absorption amount corresponding to the carbon dioxide concentration in the air. Therefore, unnecessary absorption of carbon dioxide can be prevented in the carbon dioxide concentration-controlling device 1, and the carbon dioxide concentration in the air can be appropriately kept.

The carbon dioxide concentration-controlling device 1 controls the carbon dioxide concentration in the space by controlling the $CO_2$ absorption rate of the absorbing material itself. Therefore, the amount of carbon dioxide absorbed from the air can be easily controlled without managing and controlling complicated parameters such as the amount of air taken from the space.

The time intervals at which the detector 20 detects the carbon dioxide concentration in the above process control may be set in advance or may be freely set by a user. As the time intervals for the detection by the detector 20 become short, the amount of carbon dioxide absorbed by the carbon dioxide-absorbing material 30 can be controlled frequently. This provides an advantage in that the carbon dioxide concentration in the space can be more precisely controlled.

In the above description, the case where the $CO_2$ absorption rate of the lithium composite oxide is controlled in accordance with temperature has been described. However, the $CO_2$ absorption rate of the carbon dioxide-absorbing material 30 may be controlled by controlling a state other than temperature. In this case, when the carbon dioxide concentration detected by the detector 20 is lower than or equal to the set value (YES in S12), the state determining unit 11 may determine the state of the carbon dioxide-absorbing material 30 to be a state (value) in which the $CO_2$ absorption rate of the carbon dioxide-absorbing material 30 is the device lower-limit rate. When the carbon dioxide concentration detected by the detector 20 is higher than the set value (NO in S12), the state determining unit 11 may determine the state of the carbon dioxide-absorbing material 30 to be a state in which the $CO_2$ absorption rate of the carbon dioxide-absorbing material 30 is higher than the device lower-limit rate.

<<Modification>>

The carbon dioxide-absorbing material 30 according to the present invention is desirably an absorbing material capable of not only absorbing carbon dioxide in the air, but also releasing the absorbed carbon dioxide (refreshing of the carbon dioxide-absorbing material 30). Hereafter, the refreshing function of the carbon dioxide-absorbing material 30 will be described using a lithium composite oxide as an example.

At a temperature higher than a temperature at which the lithium composite oxide is capable of absorbing carbon dioxide (temperature higher than Tu in FIG. 2), the lithium composite oxide has a characteristic of releasing the absorbed carbon dioxide. In the carbon dioxide concentration-controlling device 1 according to this embodiment, the lithium composite oxide may be refreshed using the above characteristic.

Specifically, for example, when the $CO_2$ absorption rate of the lithium composite oxide is saturated or the absorptivity of the lithium composite oxide is decreased to a certain degree, the carbon dioxide concentration-controlling device 1 is put outside the space where the carbon dioxide concentration is controlled. Then, by controlling the temperature of the lithium composite oxide to a temperature (higher than Tu) at which carbon dioxide is released, the absorbed carbon dioxide (carbon dioxide contained in the air in the space) is released from the lithium composite oxide.

In the related art, an amine-based material or activated carbon has been used as a material for such a carbon dioxide-absorbing material. Among them, an amine-based material chemically strongly bonds to carbon dioxide, and thus a large amount of energy is required to release the absorbed carbon dioxide (refreshing). Activated carbon hardly releases the absorbed carbon dioxide and thus an absorbing material needs to be frequently replaced, which increases the cost for the replacement.

In contrast, as described above, the carbon dioxide concentration-controlling device 1 uses an absorbing material that can be refreshed as the carbon dioxide-absorbing material 30, and the carbon dioxide-absorbing material 30 can be reused by appropriately refreshing the carbon dioxide-absorbing material 30. Therefore, the replacement of the carbon dioxide-absorbing material 30 can be eliminated or the frequency of the replacement can be decreased. This produces an effect of decreasing the cost for the replacement of the carbon dioxide-absorbing material 30.

When the carbon dioxide-absorbing material 30 is refreshed, only the carbon dioxide-absorbing material 30 but not the carbon dioxide concentration-controlling device 1 may be put outside the space to release carbon dioxide. In this carbon dioxide concentration-controlling device 1, ease of carrying in refreshing the carbon dioxide-absorbing material 30 can be achieved.

The carbon dioxide concentration-controlling device 1 may include a configuration for specifying the timing of the refreshing by measuring the weight of the carbon dioxide-absorbing material 30 or the maximum carbon dioxide absorption rate. With this configuration, the carbon dioxide concentration-controlling device 1 is capable of accurately specifying the timing at which the refreshing of the carbon dioxide-absorbing material 30 is required. Therefore, the absorptivity of the carbon dioxide-absorbing material 30 can be maximized, which allows more accurate control of the carbon dioxide concentration.

The carbon dioxide concentration-controlling device 1 may also include a configuration for notifying a user of the specified timing. Thus, the carbon dioxide concentration-controlling device 1 allows the user to perform refreshing of the carbon dioxide-absorbing material 30 at an appropriate timing.

Second Embodiment

Figure 5:
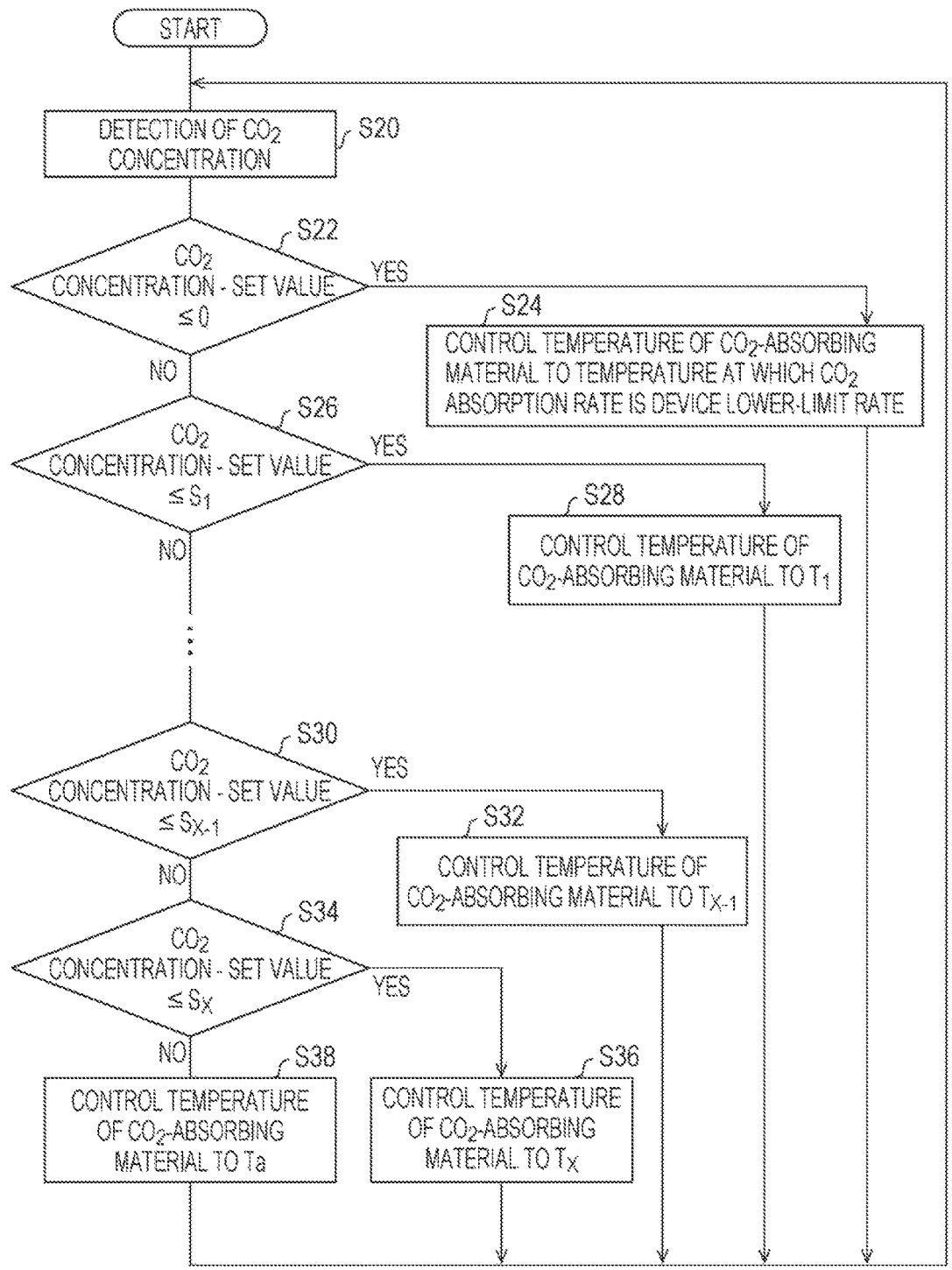
FIG. 5 is a flowchart illustrating a process flow of the carbon dioxide concentration-controlling device.

A second embodiment according to the present invention will be described below with reference to FIG. 4 and FIG. 5. For the sake of convenience, members having the same functions as those described in the above embodiment are denoted by the same reference numerals, and the descriptions thereof are omitted.

The carbon dioxide concentration-controlling device 1 according to the present invention may be configured to control the state of the carbon dioxide-absorbing material 30 so that the $CO_2$ absorption rate of the carbon dioxide-absorbing material 30 increases as the difference between the carbon dioxide concentration detected by the detector 20 and the set value increases, in addition to the configuration described in the first embodiment. Hereafter, as in the first embodiment, the case where a lithium composite oxide is used as the carbon dioxide-absorbing material 30 and the $CO_2$ absorption rate is controlled by controlling the temperature of the lithium composite oxide will be described as an example.

This embodiment is different from the first embodiment in that the state of the carbon dioxide-absorbing material 30 is determined stepwise in accordance with the difference between the carbon dioxide concentration and the set value. Hereafter, a specific process control will be described with reference to FIG. 4 and FIG. 5. FIG. 4 is a table illustrating the relationship between the carbon dioxide concentration detected by the detector 20, the set value, and the lithium composite oxide in the carbon dioxide concentration-controlling device 1 according to this embodiment.

The "($CO_2$ concentration−set value)" column indicates a difference (carbon dioxide concentration−set value) between the carbon dioxide concentration detected by the detector 20 and the set value. The "set temperature" column indicates a temperature of the lithium composite oxide determined by the state determining unit 11 (i.e., temperature of lithium composite oxide). In the drawing, $S_1$, $S_{X-1}$, and $S_X$ satisfy $0 < S_1 < S_{X-1} < S_X$. Furthermore, Ta that represents the temperature of the lithium composite oxide corresponds to Ta in the graph of FIG. 2, and $T_1$ and $T_X$ satisfy a temperature at which the $CO_2$ absorption rate is the device lower-limit rate $<T_1<T_X<$Ta. Note that X in $S_{X-1}$, $S_X$, $T_X$, and the like represents a natural number.

In this embodiment, the difference between the carbon dioxide concentration and the set value is divided into X sections, and the temperature (temperature at which the device lower-limit rate is achieved, $T_1$, ... $T_X$, Ta) of the lithium composite oxide is determined in accordance with whether the difference is a predetermined separation value $(0, S_1 \ldots S_X)$ or less.

When the state determining unit 11 of the carbon dioxide concentration-controlling device 1 according to this embodiment receives the carbon dioxide concentration in the air from the detector 20, the state determining unit 11 calculates the difference between the carbon dioxide concentration and the predetermined set value. The state determining unit 11 determines the temperature of the lithium composite oxide as illustrated in the table of FIG. 4 in accordance with the calculated difference and notifies the state controlling unit 12 of the temperature. It is sufficient that the carbon dioxide concentration-controlling device 1 determines the temperature of the lithium composite oxide under the conditions in FIG. 4. The carbon dioxide concentration-controlling device 1 does not necessarily store and access such a table in FIG. 4.

Hereafter, a flow of the temperature control of the carbon dioxide concentration-controlling device 1 according to this embodiment will be specifically described with reference to FIG. 5. FIG. 5 illustrates a flow of the temperature control process of the carbon dioxide concentration-controlling device 1 according to the second embodiment.

While the carbon dioxide concentration-controlling device 1 is operated (takes in air), the detector 20 detects the carbon dioxide concentration in the air at predetermined time intervals (S20). The detected carbon dioxide concentration is sent to the state determining unit 11. Upon receiving the carbon dioxide concentration, the state determining unit 11 calculates the difference between the carbon dioxide concentration and the set value. The state determining unit 11 determines the temperature corresponding to the difference as a temperature of the lithium composite oxide and notifies the state controlling unit 12 of the temperature.

When the difference between the carbon dioxide concentration and the set value is 0 or less (YES in S22), the carbon dioxide concentration is lower than or equal to the set value. That is, an appropriate carbon dioxide concentration is kept in the space. In this case, as illustrated in FIG. 4, the state determining unit 11 determines the temperature of the lithium composite oxide to be a temperature (e.g., room temperature) at which the $CO_2$ absorption rate is the device lower-limit rate. The state controlling unit 12 controls the temperature of the lithium composite oxide to the temperature determined by the state determining unit 11 (S24). Thus, the $CO_2$ absorption rate of the lithium composite oxide reaches the device lower-limit rate. In other words, the $CO_2$ absorption rate of the lithium composite oxide is decreased as much as possible, which minimizes a variation in the carbon dioxide concentration in the air.

When the difference between the carbon dioxide concentration and the set value is more than 0 and $S_1$ or less (NO in S22 and YES in S26), the state determining unit 11 determines the temperature of the lithium composite oxide to be $T_1$, which is a temperature in the first section. The state controlling unit 12 controls the temperature of the lithium composite oxide to $T_1$ (S28). Thus, the lithium composite oxide absorbs carbon dioxide in the air.

Hereafter, the state determining unit 11 determines whether the difference between the carbon dioxide concentration and the set value is a predetermined separation value or less. When the difference is a separation value or less, the state determining unit 11 determines the temperature corresponding to the separation value as the temperature of the lithium composite oxide. For example, when the difference between the carbon dioxide concentration and the set value is more than $S_{X-2}$ and $S_{X-1}$ or less (YES in S30), the state determining unit 11 determines the temperature of the lithium composite oxide to be $T_{X-1}$, which is a temperature in the (X−1)th section, and the state controlling unit 12 controls the temperature of the lithium composite oxide to $T_{X-1}$ (S32). When the difference between the carbon dioxide concentration and the set value is more than $S_{X-1}$ and $S_X$ or less (NO in S30 and YES in S34), the state determining unit 11 determines the temperature of the lithium composite oxide to be $T_X$ (higher than $T_{X-1}$), which is a temperature in the Xth section, and the state controlling unit 12 controls the temperature of the lithium composite oxide to $T_X$ (S36).

Finally, when the difference between the carbon dioxide concentration and the set value is more than $S_X$ (NO in S34), the carbon dioxide concentration in the space is assumed to be above the limit of the separation values ($S_1 \ldots S_X$) set in the carbon dioxide concentration-controlling device 1. In this case, the state determining unit 11 determines the temperature of the lithium composite oxide to be Ta, which is a temperature at which carbon dioxide is absorbed as much as possible (at the highest rate), and the state controlling unit 12 controls the temperature of the lithium composite oxide to Ta (S38).

In the above process, the carbon dioxide concentration-controlling device 1 is capable of minutely changing the $CO_2$ absorption rate of the lithium composite oxide by determining the temperature of the lithium composite oxide stepwise in accordance with the difference between the carbon dioxide concentration and the set value. Therefore, for example, when the carbon dioxide concentration in the air is slightly higher than the set value, unnecessary absorption of carbon dioxide in the air due to an excessively high $CO_2$ absorption rate of the lithium composite oxide can be prevented. In this case, since the temperature of the lithium composite oxide is controlled to a temperature lower than Ta as described above, the energy consumption for temperature control (heating) can be suppressed compared with the carbon dioxide concentration-controlling device 1 according to the first embodiment. When the carbon dioxide concentration in the air is much higher than the set value, the carbon dioxide concentration in the space can be more quickly brought close to the set value by maximizing the $CO_2$ absorption rate of the lithium composite oxide.

Third Embodiment

As described in the first embodiment, a carbon dioxide concentration in the air of a predetermined value (e.g., 1000 ppm) or higher may cause the damage to health of human beings. However, an excessively low carbon dioxide concentration in the air is also not preferred for health of human beings. For example, if carbon dioxide in the air is present in a low concentration, the blood of humans that inhale the air becomes alkaline and fainting and convulsions may be caused. In order to keep an appropriate carbon dioxide concentration in the air, therefore, the carbon dioxide concentration is desirably controlled by not only setting the upper limit of the carbon dioxide concentration in the air, but also setting the lower limit.

Hereafter, a third embodiment according to the present invention will be described with reference to FIG. 6. The carbon dioxide concentration-controlling device 1 according to this embodiment is different from those in the first and second embodiments in that an absorbing material capable of releasing carbon dioxide is used as the carbon dioxide-absorbing material 30 and the carbon dioxide concentration in the air is controlled to be within a predetermined range.

More specifically, when the carbon dioxide concentration detected by the detector 20 is higher than a set upper-limit value (set value, first threshold), the state determining unit 11 according to this embodiment determines the state (e.g., temperature) of the carbon dioxide-absorbing material 30 to be a state in which the carbon dioxide-absorbing material 30 absorbs carbon dioxide in the air. When the carbon dioxide concentration is a set lower-limit value (second threshold) or lower, the state determining unit 11 determines the state of the carbon dioxide-absorbing material 30 to be a state in which the carbon dioxide-absorbing material 30 releases the absorbed carbon dioxide. The term "set lower-limit value" refers to a lower-limit value of a carbon dioxide concentration which is believed to be appropriate in the air in the space. The lower-limit value may be, for example, a lower-limit value of a carbon dioxide concentration that does not cause the damage to health of human beings.

Hereafter, also in this embodiment, the case where a lithium composite oxide is used as the carbon dioxide-absorbing material 30 and the $CO_2$ absorption rate is controlled by controlling the temperature of the lithium composite oxide will be described as in the first and second embodiments.

As described above, at a temperature higher than a temperature at which the lithium composite oxide is capable of absorbing carbon dioxide (temperature higher than Tu in FIG. 2), the lithium composite oxide has a characteristic of releasing the absorbed carbon dioxide. In the carbon dioxide concentration-controlling device 1 according to this embodiment, when the carbon dioxide concentration is a set lower-limit value or lower, the lithium composite oxide is caused to release carbon dioxide by controlling the temperature of the lithium composite oxide to a temperature Tr higher than Tu using the above characteristic.

The amount of carbon dioxide released from the lithium composite oxide per unit time is dependent on temperature. In the carbon dioxide concentration-controlling device 1, therefore, the releasing rate (releasing amount) of carbon dioxide may also be controlled by changing the temperature Tr as in the control of the $CO_2$ absorption rate described in the second embodiment.

Figure 6:
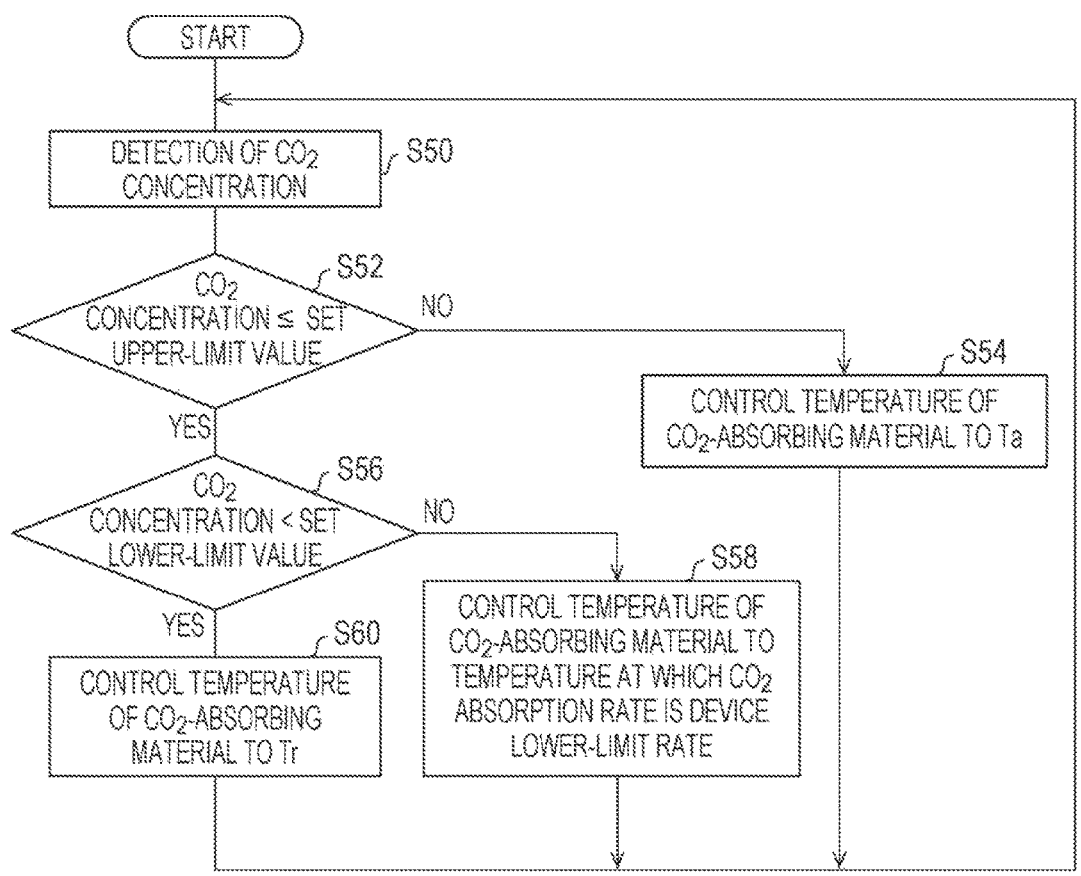
FIG. 6 is a flowchart illustrating a process flow of a carbon dioxide concentration-controlling device according to a third embodiment of the present invention.

FIG. 6 is a flowchart illustrating a flow of a control process performed by the carbon dioxide concentration-controlling device 1 according to this embodiment. Also in this embodiment, the detector 20 detects the carbon dioxide concentration in the air at predetermined time intervals (S50) and sends the carbon dioxide concentration to the state determining unit 11 as in the first and second embodiments. Then, the state determining unit 11 determines whether the received carbon dioxide concentration is a set upper-limit value or lower (S52). When the carbon dioxide concentration detected by the detector 20 is higher than the set upper-limit value (NO in S52), the state determining unit 11 determines the temperature of the lithium composite oxide to be Ta. The state controlling unit 12 controls the temperature of the lithium composite oxide to Ta (S54). Thus, the lithium composite oxide absorbs carbon dioxide as much as possible (at the highest rate).

When the carbon dioxide concentration detected by the detector 20 is a set upper-limit value or lower (YES in S52), the state determining unit 11 determines whether the carbon dioxide concentration is lower than the set lower-limit value (S56). Herein, when the carbon dioxide concentration is higher than or equal to the set lower-limit value (NO in S56), the state determining unit 11 determines the temperature of the lithium composite oxide to be a temperature (e.g., room temperature) at which the $CO_2$ absorption rate is the device lower-limit rate. The state controlling unit 12 controls the temperature of the lithium composite oxide to the determined temperature (S58). Thus, the $CO_2$ absorption rate of the lithium composite oxide reaches the device lower-limit rate. In other words, the $CO_2$ absorption rate of the lithium composite oxide is decreased as much as possible, which minimizes a variation in the carbon dioxide concentration in the air.

When the carbon dioxide concentration is lower than the set lower-limit value (YES in S56), the state determining unit 11 determines the temperature of the lithium composite oxide to be Tr. The state controlling unit 12 controls the temperature of the lithium composite oxide to Tr (S60). Thus, the lithium composite oxide releases the carbon dioxide that has been absorbed by the lithium composite oxide to the air.

The determinations in S52 and S56 may be performed in inverse order. In S58, the state determining unit 11 may determine the temperature of the lithium composite oxide (temperature at which the $CO_2$ absorption rate is the device lower-limit rate) to be Tu in FIG. 2. Tu is a temperature that is higher than Ta and lower than Tr and that is a boundary temperature between absorption and release of carbon dioxide by the lithium composite oxide. Therefore, when the temperature of the lithium composite oxide is set to Tu in S58, a change in the temperature of the lithium composite oxide is small compared with, for example, the case where the temperature is set to room temperature. Thus, the state controlling unit 12 can heat the lithium composite oxide or dissipate heat of (cool) the lithium composite oxide to the temperature determined by the state determining unit 11 within a shorter time. When heat of the lithium composite oxide is dissipated in S58 (decrease to room temperature), there is no need to use an electric power for the temperature control of the lithium composite oxide by the state controlling unit 12 in the process of S58 as described in the first embodiment (heat may be simply dissipated).

In the above process, when the carbon dioxide concentration in the air is higher than the set upper-limit value (NO in S52), that is, when the carbon dioxide concentration in the air is above the appropriate range, the carbon dioxide concentration-controlling device 1 decreases the carbon dioxide concentration in the air by causing the lithium composite oxide serving as the carbon dioxide-absorbing material 30 to absorb carbon dioxide. When the carbon dioxide concentration in the air is lower than or equal to the set upper-limit value and higher than or equal to the set lower-limit value (NO in S56), that is, when the carbon dioxide concentration in the air is within the appropriate range, an appropriate carbon dioxide concentration is kept by decreasing the amount of carbon dioxide absorbed by the lithium composite oxide as much as possible. When the carbon dioxide concentration in the air is lower than the set lower-limit value (YES in S56), the carbon dioxide concentration in the air is below the appropriate range, and thus the carbon dioxide concentration in the air is increased by releasing carbon dioxide from the lithium composite oxide to the air. Accordingly, when the carbon dioxide concentration in the air is excessively decreased, the carbon dioxide concentration can be increased to achieve an appropriate carbon dioxide concentration.

As described above, the carbon dioxide concentration-controlling device 1 according to this embodiment controls the carbon dioxide concentration in the air to be within the predetermined range. Consequently, the carbon dioxide concentration in the air can be stably kept in an appropriate range for a long time. Furthermore, when the carbon dioxide concentration in the air is lower than the set lower-limit value, carbon dioxide is released from the carbon dioxide-absorbing material 30. This decreases the frequency of the replacement or refreshing of the carbon dioxide-absorbing material 30.

Fourth Embodiment

The carbon dioxide concentration-controlling device according to the present invention preferably humidifies the air (the air in contact with the carbon dioxide-absorbing material or the air passing through the gap of the carbon dioxide-absorbing material) in an ambient space of the carbon dioxide-absorbing material 30.

Figure 7:
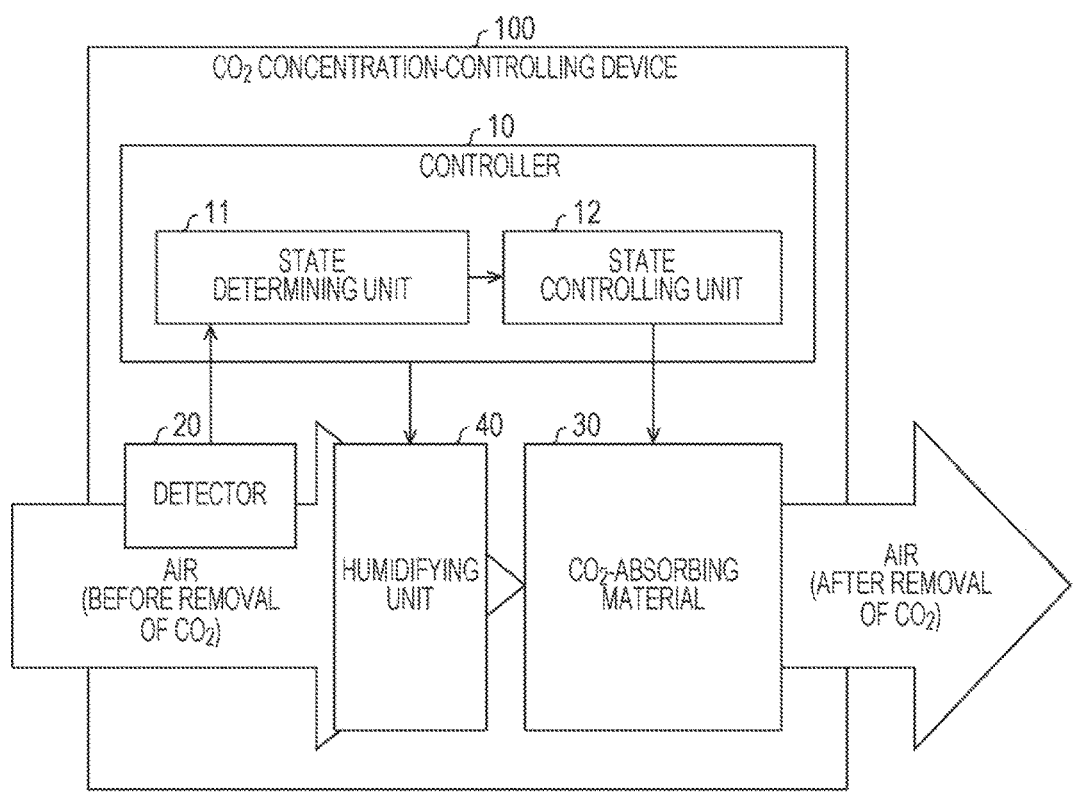
FIG. 7 is a block diagram illustrating a configuration of principal parts of a carbon dioxide concentration-controlling device according to a fourth embodiment of the present invention.

Hereafter, a fourth embodiment of the present invention will be described with reference to FIGS. 7 and 8. FIG. 7 is a block diagram illustrating a configuration of principal parts of a carbon dioxide concentration-controlling device 100 according to the present invention. The carbon dioxide concentration-controlling device 100 further includes a humidifying unit 40 added to the carbon dioxide concentration-controlling devices 1 according to the first to third embodiments. The configuration of the carbon dioxide concentration-controlling device 100 according to this embodiment may be combined with any of the carbon dioxide concentration-controlling devices 1 in the first to third embodiments.

The humidifying unit 40 is configured to humidify air to be sent to the carbon dioxide-absorbing material 30. The humidifying unit 40 humidifies the air taken into the humidifying unit 40 or the air passing through the humidifying unit 40. The humidity of the humidified air is not particularly limited. For example, at 23° C., the humidity is desirably 50% RH (relative humidity) or higher.

The position of the humidifying unit 40 installed is not particularly limited as long as the air taken into the carbon dioxide concentration-controlling device 100 can be humidified before passing through the carbon dioxide-absorbing material 30. The position of the humidifying unit 40 installed may be changed in accordance with a detection method for detecting the carbon dioxide concentration by the detector 20. For example, if the precision of the detection of the carbon dioxide concentration by the detector 20 is increased by decreasing the humidity of air to be detected, the humidifying unit 40 is desirably installed at a position after the air passes through the detector 20 and before the air contacts the carbon dioxide-absorbing material 30.

Next, the relationship between the humidity of air in contact with the carbon dioxide-absorbing material 30 and the carbon dioxide absorptivity of the carbon dioxide-absorbing material 30 will be described. FIG. 8 illustrates changes in carbon dioxide concentration with different humidities over time in a closed space (volume: 12 L) containing a lithium composite oxide (0.2 g). In the drawing, for example, the state in which the humidity is 50% RH or higher is referred to as a "high-humidity state" and the state in which the humidity is lower than 50% is referred to as a "low-humidity state".

Figure 8:
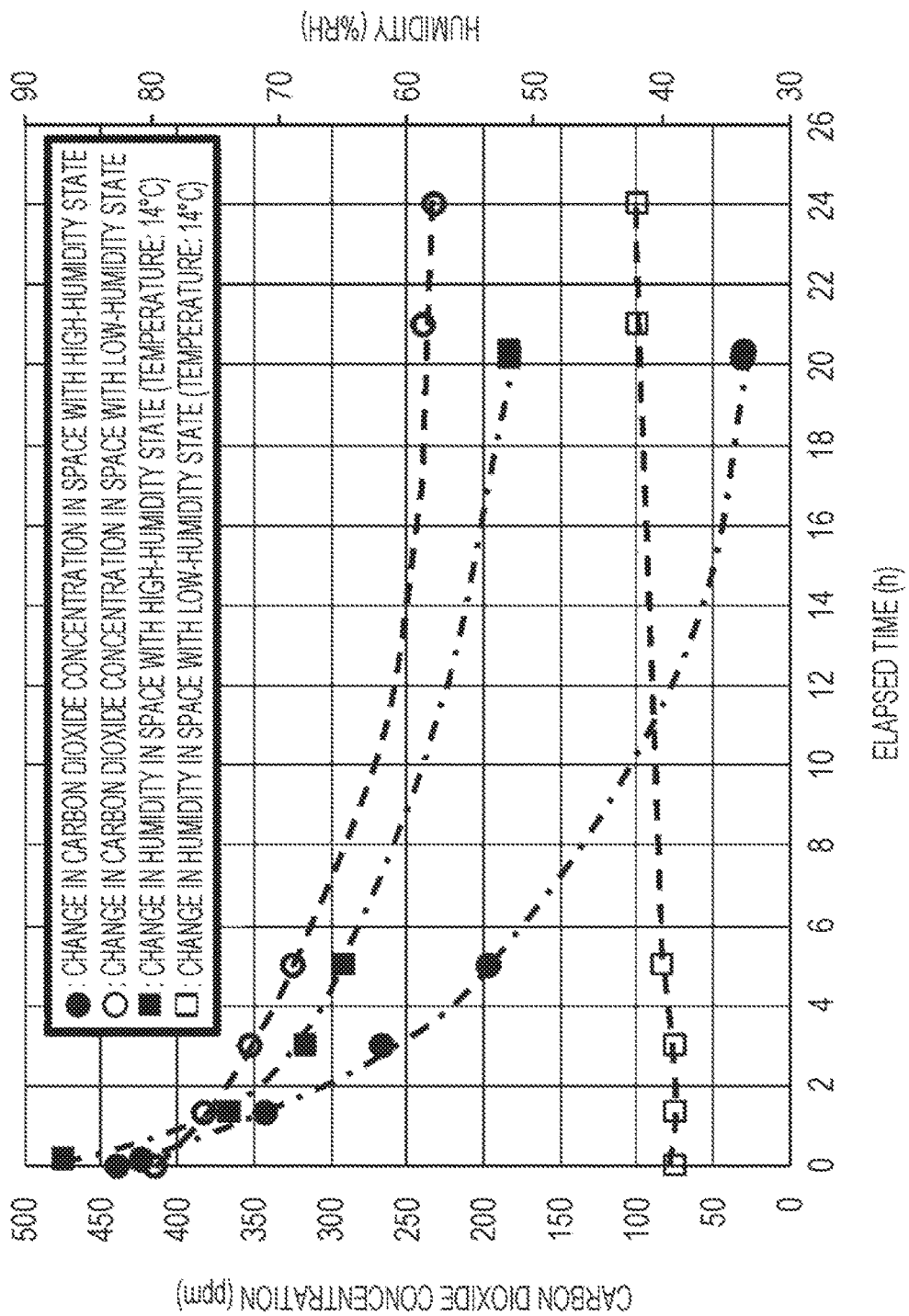
FIG. 8 illustrates changes in carbon dioxide concentration with different humidities over time in a closed space containing a lithium composite oxide.

As is clear from FIG. 8, in the closed space containing the lithium composite oxide, the carbon dioxide concentration decreases more quickly in the high-humidity state than in the low-humidity state. That is, the lithium composite oxide is capable of absorbing carbon dioxide more quickly from the air with a high-humidity state. In the carbon dioxide concentration-controlling device 100, therefore, when carbon dioxide needs to be absorbed more quickly (in a larger amount), the lithium composite oxide can be caused to absorb a larger amount of carbon dioxide within a shorter time by passing the air with a high-humidity state through the lithium composite oxide.

Furthermore, when the humidity of the air in contact with the lithium composite oxide is increased, the maximum amount (saturated absorption amount) of carbon dioxide absorbed per unit volume of the lithium composite oxide is also increased. Therefore, by humidifying the air in contact with the lithium composite oxide, the same saturated absorption amount can be realized using a smaller amount of the lithium composite oxide. Thus, the carbon dioxide concentration-controlling device 100 produces an effect of decreasing the amount of the carbon dioxide-absorbing material 30 used.

Fifth Embodiment

Figure 9:
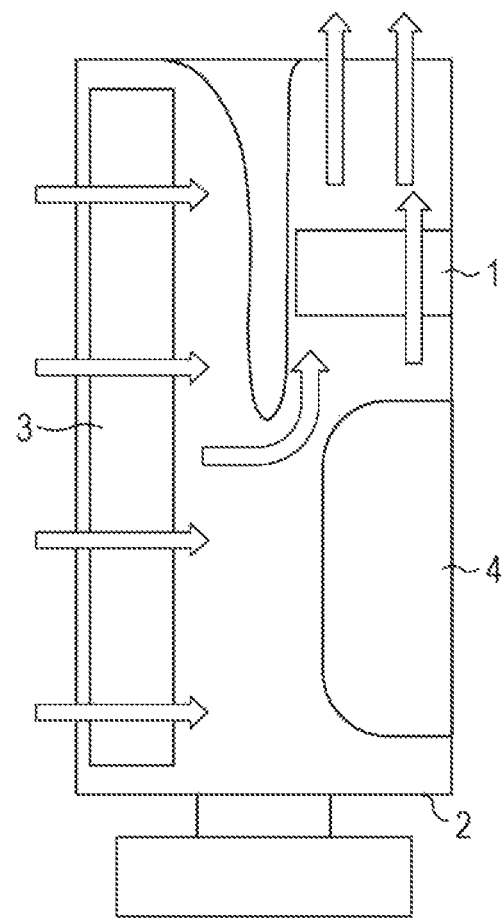
FIG. 9 illustrates a schematic configuration of an air purifier into which the carbon dioxide concentration-controlling device according to any one of the first to fourth embodiments of the present invention is incorporated.

The carbon dioxide concentration-controlling device according to the present invention may be incorporated in electronic apparatuses such as air purifiers, dehumidifiers, and humidifiers. FIG. 9 illustrates a schematic configuration of an air purifier 2 including the carbon dioxide concentration-controlling device therein. The arrows in the drawing indicate a flow of air taken in the air purifier 2.

As illustrated in the drawing, the air purifier 2 includes the carbon dioxide concentration-controlling device 1 or 100 according to any one of the first to fourth embodiments, a fan 4, and a filter 3. The fan 4 is used to take air into the air purifier. The filter 3 is used to clean the air taken into the air purifier by the fan 4. Non-limiting examples of the filter 3 include deodorizing air-conditioner filters, formaldehyde-absorbing air-conditioner filters, antimicrobial/dust collection air-conditioner filters, and filters obtained by combining the foregoing filters.

The air purifier 2 takes in air by operating the fan 4. Herein, the air passes through the filter 3. The air cleaned as a result of the passage through the filter 3 is taken into the carbon dioxide concentration-controlling device 1 or 100 as illustrated in the drawing. The carbon dioxide concentration-controlling device 1 or 100 then detects the carbon dioxide concentration in the taken air and controls the $CO_2$ absorption rate of the carbon dioxide-absorbing material 30 in accordance with the carbon dioxide concentration.

In the above configuration, the air purifier 2 is capable of discharging the cleaned air whose carbon dioxide concentration has been adjusted to an appropriate value. Thus, air good for health of human beings can be discharged. The air purifier 2 allows both air intake for cleaning air with the filter 3 and air intake for the carbon dioxide concentration-controlling device 1 or 100 incorporated in the air purifier 2 by operating the fan 4. In other words, the air purifier 2 may include a fan shared between an air-cleaning member of the air purifier and the carbon dioxide concentration-controlling device 1 or 100. This decreases the number of parts of the air purifier 2, which achieves a decrease in the production cost.

The filter 3 is desirably configured to remove a substance (hereafter, referred to as a "detection-inhibiting substance") that inhibits the detection of the carbon dioxide concentration in the carbon dioxide concentration-controlling device 1 or 100 (detector 20). The detection-inhibiting substance is, for example, dust in the air. In this case, the detector 20 of the carbon dioxide concentration-controlling device 1 or 100 detects the carbon dioxide concentration from the air from which the detection-inhibiting substance has been removed by the filter 3, which produces an effect of more accurately detecting the carbon dioxide concentration. This also prevents the degradation of detection accuracy due to adhesion of the detection-inhibiting substance to the detector 20 itself. Therefore, the carbon dioxide concentration-controlling device 1 or 100 produces an effect of more accurately controlling the carbon dioxide concentration in the space in a continuous manner.

The carbon dioxide concentration-controlling device 1 or 100 may be installed in, for example, a dehumidifier or a humidifier instead of the air purifier 2. In this case, such a dehumidifier or humidifier is capable of controlling humidity and discharging the air whose carbon dioxide concentration has been controlled to an appropriate value. Therefore, a space where human beings feel pleasant can be provided by discharging comfortable air for human beings into the space.

In particular, for example, when the carbon dioxide concentration-controlling device 1 is installed in a dehumidifier and a semiconductor sensor is used as the detector 20, the dehumidifier includes a dehumidifying unit instead of the above-described filter 3 of the air purifier 2 and air dehumidified with the dehumidifying unit is sent to the carbon dioxide concentration-controlling device 1, whereby the carbon dioxide concentration of dehumidified air can be detected in the carbon dioxide concentration-controlling device 1. In the carbon dioxide concentration-controlling device 1, therefore, the reliability of the detection of the carbon dioxide concentration by the semiconductor sensor can be prevented from degrading because of the presence of moisture. Thus, the carbon dioxide concentration can be more accurately detected. The adhesion of water vapor to the detector 20 itself can also be prevented.

As described above, the carbon dioxide concentration-controlling device 1 or 100 according to the present invention is desirably used in a space where ventilation can be limited. Therefore, the carbon dioxide concentration-controlling device 1 is preferably installed in an electronic apparatus such as a vehicle-mounted air purifier or is preferably used together with the electronic apparatus.

The fourth and fifth embodiments show that the control of the carbon dioxide absorption rate in the carbon dioxide concentration-controlling device can be performed by not only temperature control, but also humidity control.

That is, the means for controlling the carbon dioxide absorption rate in the carbon dioxide concentration-controlling device is not limited to temperature control, but may be humidity control or air-supply control for the carbon dioxide-absorbing material.

[Conclusion]

A carbon dioxide concentration-controlling device (carbon dioxide concentration-controlling device 1 or carbon dioxide concentration-controlling device 100) according to a first aspect of the present invention includes a detector (detector 20) configured to detect a carbon dioxide concentration in air, an absorbing material (carbon dioxide-absorbing material 30) which absorbs carbon dioxide contained in the air and whose carbon dioxide absorption rate ($CO_2$ absorption rate) is controllable, and an absorption rate controller (controller 10) configured to control the absorption rate of the absorbing material in accordance with a carbon dioxide concentration detected by the detector.

According to the above configuration, the carbon dioxide concentration-controlling device controls the $CO_2$ absorption rate of the absorbing material itself in accordance with the carbon dioxide concentration. Therefore, carbon dioxide can be absorbed at an appropriate absorption rate in accordance with the carbon dioxide concentration in the air.

Accordingly, unnecessary absorption of carbon dioxide can be prevented in the carbon dioxide concentration-controlling device, and the carbon dioxide concentration in the air can be controlled to an appropriate value.

In other words, the carbon dioxide concentration-controlling device including the above configuration is capable of controlling the carbon dioxide concentration in the air to an appropriate value by newly finding a problem of "carbon dioxide is unnecessarily absorbed because the $CO_2$ absorption rate of the absorbing material itself cannot be controlled" for materials that have been used as a carbon dioxide-absorbing material, such as an amine-based material and activated carbon, and solving the problem.

In the carbon dioxide concentration-controlling device, the amount of carbon dioxide absorbed from the air can be easily controlled without managing and controlling complicated parameters such as the amount of air taken from the space.

A carbon dioxide concentration-controlling device according to a second aspect of the present invention is as follows. In the first aspect, the absorption rate controller may include a state controlling unit. When a carbon dioxide concentration detected by the detector is a first threshold (set value, set upper-limit value) or lower, the state controlling unit may change a state of the absorbing material to a state in which the absorption rate of the absorbing material is a lower-limit rate (device lower-limit rate) settable in the carbon dioxide concentration-controlling device. When a carbon dioxide concentration detected by the detector is higher than the first threshold, the state controlling unit may change a state of the absorbing material to a state in which the absorption rate of the absorbing material is an absorption rate higher than the lower-limit rate.

Herein, the phrase "lower-limit rate settable in the carbon dioxide concentration-controlling device" refers to a substantially minimum $CO_2$ absorption rate which is at least lower than the maximum $CO_2$ absorption rate and which is settable in the carbon dioxide concentration-controlling device.

According to the above configuration, therefore, when the carbon dioxide concentration in the space is an appropriate concentration (lower than or equal to the first threshold), the carbon dioxide concentration-controlling device is capable of suppressing the absorption rate of carbon dioxide as much as it can. That is, the carbon dioxide concentration-controlling device is capable of minimizing a variation in the carbon dioxide concentration in the air.

When the carbon dioxide concentration in the space is excessively high (higher than the first threshold), the carbon dioxide concentration-controlling device is capable of decreasing the carbon dioxide concentration by increasing the absorption rate of carbon dioxide by the absorbing material to cause the absorbing material to absorb carbon dioxide in the air. Thus, the carbon dioxide concentration-controlling device is capable of keeping an appropriate carbon dioxide concentration in the air.

The "lower-limit rate settable in the carbon dioxide concentration-controlling device" may be a minimum $CO_2$ absorption rate of the absorbing material per unit time in a range of temperatures the state controlling unit can control.

Furthermore, the "lower-limit rate settable in the carbon dioxide concentration-controlling device" is preferably a rate (substantially zero) which is 0 or more and is as low as the carbon dioxide concentration in the space is not affected. In this case, the absorption of carbon dioxide in the carbon dioxide concentration-controlling device can be substantially stopped by controlling the temperature of the absorbing material to a temperature at which the carbon dioxide absorption rate is the lower-limit rate settable in the carbon dioxide concentration-controlling device.

A carbon dioxide concentration-controlling device according to a third aspect of the present invention is as follows. In the second aspect, when a carbon dioxide concentration detected by the detector is higher than the first threshold, the state controlling unit may change a state of the absorbing material to a state in which carbon dioxide is absorbed more quickly as a difference between the carbon dioxide concentration and the first threshold increases.

According to the above configuration, the carbon dioxide concentration-controlling device is capable of variably controlling the $CO_2$ absorption rate of the absorbing material in accordance with the detected carbon dioxide concentration. Thus, the carbon dioxide concentration-controlling device is capable of more minutely controlling the carbon dioxide concentration in the air.

Furthermore, since the carbon dioxide concentration-controlling device controls the $CO_2$ absorption rate in accordance with the difference between the detected carbon dioxide concentration and the first threshold, carbon dioxide is not absorbed unnecessarily (at a rate higher than necessary) in the absorbing material. This can prevent the $CO_2$ absorption rate of the absorbing material corresponding to the carbon dioxide concentration in the air from being excessively increased. Furthermore, when the difference between the carbon dioxide concentration and the first threshold is large, the $CO_2$ absorption rate of the absorbing material is increased, and the carbon dioxide concentration in the space can be more quickly brought close to an appropriate value.

A carbon dioxide concentration-controlling device according to a fourth aspect of the present invention is as follows. In the second or third aspect, the absorbing material may be an absorbing material that controllably releases absorbed carbon dioxide. When a carbon dioxide concentration detected by the detector is lower than a second threshold (set lower-limit value) that is lower than the first threshold, the state controlling unit may change a state of the absorbing material to a state in which the absorbing material releases absorbed carbon dioxide.

According to the above configuration, when the carbon dioxide concentration in the air is lower than the second threshold, that is, a lower-limit value of the carbon dioxide concentration which is believed to be appropriate, the carbon dioxide concentration-controlling device changes a state of the absorbing material to a state in which carbon dioxide is released. Thus, when the carbon dioxide concentration in the air is excessively decreased, the carbon dioxide concentration-controlling device is capable of increasing the carbon dioxide concentration and bringing the carbon dioxide concentration close to an appropriate value. Accordingly, the carbon dioxide concentration-controlling device is capable of stably controlling the carbon dioxide concentration in the space to an appropriate concentration for a long time.

A carbon dioxide concentration-controlling device according to a fifth aspect of the present invention is as follows. In the fourth aspect, when a carbon dioxide concentration detected by the detector is lower than or equal to the first threshold and higher than or equal to the second threshold, the state controlling unit may change a state of the absorbing material to a state in which the absorption rate of the absorbing material is the lower-limit rate settable in the carbon dioxide concentration-controlling device.

According to the above configuration, when the carbon dioxide concentration in the air is lower than or equal to the first threshold and higher than or equal to the second threshold, that is, when the carbon dioxide concentration in the air is within an appropriate range, the carbon dioxide concentration-controlling device decreases the carbon dioxide absorption rate as much as it can. This can minimize a variation in the carbon dioxide concentration in the air. Accordingly, the carbon dioxide concentration-controlling device is capable of keeping the carbon dioxide concentration in the air within an appropriate range.

A carbon dioxide concentration-controlling device according to a sixth aspect of the present invention is as follows. In any one of the first to fifth aspects, the absorbing material may be an absorbing material that absorbs carbon dioxide at a rate corresponding to a temperature of the absorbing material, and the absorption rate controller may be configured to control the absorption rate of the absorbing material by controlling the temperature of the absorbing material in accordance with a carbon dioxide concentration detected by the detector.

According to the above configuration, the carbon dioxide concentration-controlling device is capable of controlling the carbon dioxide concentration in the air to an appropriate concentration by controlling the temperature of the absorbing material in accordance with the carbon dioxide concentration in the air. Herein, the temperature of the absorbing material is generally a parameter that is easily changed and maintained, and thus is a parameter that can be accurately changed and maintained. Therefore, the carbon dioxide concentration-controlling device is capable of easily and accurately controlling the $CO_2$ absorption rate of the absorbing material by only controlling the temperature of the absorbing material in accordance with the carbon dioxide concentration.

A carbon dioxide concentration-controlling device according to a seventh aspect of the present invention is as follows. In any one of the first to sixth aspects, an absorbing material may be a lithium composite oxide.

A lithium composite oxide is an absorbing material whose carbon dioxide absorption rate is controllable with temperature. Therefore, the carbon dioxide concentration-controlling device is capable of easily and minutely controlling the $CO_2$ absorption rate of the absorbing material by using the lithium composite oxide as an absorbing material.

A lithium composite oxide is capable of selectively absorbing only carbon dioxide. Therefore, the lithium composite oxide is capable of absorbing only carbon dioxide without absorbing substances, such as nitrogen, contained in the air in amounts larger than that of carbon dioxide. Thus, the use of the lithium composite oxide as an absorbing material can prevent a considerable decrease in air pressure in the space due to absorption of the above substances contained in the air in large amounts in absorbing carbon dioxide. Furthermore, since the lithium composite oxide does not absorb substances other than carbon dioxide, the use of the lithium composite oxide as an absorbing material can prevent the degradation of absorptivity of carbon dioxide of the absorbing material caused by substances other than carbon dioxide.

Furthermore, the lithium composite oxide is an absorbing material capable of discharging (releasing) carbon dioxide that has been absorbed by the absorbing material at a predetermined temperature. Therefore, in the case where the lithium composite oxide is used as an absorbing material, for example, when the amount of carbon dioxide absorbed by the lithium composite oxide is saturated or when the absorptivity of the lithium composite oxide is decreased to a certain degree, the absorbing material can be refreshed. Furthermore, in the case where the lithium composite oxide is used as an absorbing material, when the carbon dioxide concentration in the air is decreased, carbon dioxide absorbed by the absorbing material can be released to the air. That is, the carbon dioxide concentration-controlling device is also capable of not only absorbing carbon dioxide, but also adding (discharging) carbon dioxide.

A carbon dioxide concentration-controlling device according to an eighth aspect of the present invention is as follows. In the seventh aspect, the absorbing material may be a lithium composite oxide containing $Li_4SiO_4$ as a main component.

Herein, the "main component" refers to a substance having the highest content among substances contained in the lithium composite oxide, such as a substance having a content of 50% or more. Furthermore, $Li_4SiO_4$ is an absorbing material having excellent absorptivity (absorption rate) of carbon dioxide. Therefore, when the lithium composite oxide containing $Li_4SiO_4$ as a main component is used as an absorbing material, the carbon dioxide concentration-controlling device is capable of absorbing a larger amount of carbon dioxide within a shorter time.

A carbon dioxide concentration-controlling device (carbon dioxide concentration-controlling device 100) according to a ninth aspect of the present invention is as follows. The carbon dioxide concentration-controlling device according to any one of the first to eighth aspects may further include a humidifying unit configured to humidify air in an ambient space of the absorbing material.

According to the above configuration, the carbon dioxide concentration-controlling device is capable of absorbing carbon dioxide within a short time compared with the case where the air is not humidified, and the amount of the lithium composite oxide used can be decreased.

An electronic apparatus according to a tenth aspect of the present invention includes the carbon dioxide concentration-controlling device according to any one of the first to ninth aspects.

The present invention is not limited to the above-described embodiments, and various modifications can be made within the scope of the claims. An embodiment obtained by appropriately combining technical means disclosed in different embodiments is also included in the technical scope of the present invention. Furthermore, a new technical feature may be obtained by combining technical means disclosed in the embodiments.

INDUSTRIAL APPLICABILITY

The present invention is suitably applicable to carbon dioxide concentration-controlling devices that control a carbon dioxide concentration and electronic apparatuses such as air purifiers, dehumidifiers, and humidifiers including the carbon dioxide concentration-controlling device.

REFERENCE SIGNS LIST 1, 100 carbon dioxide concentration-controlling device
10 controller (absorption rate controller)
11 state determining unit
12 state controlling unit
20 detector
30 carbon dioxide-absorbing material (absorbing material)
40 humidifying unit
2 air purifier (electronic apparatus)
3 filter
4 fan

The invention claimed is:
1. A carbon dioxide concentration-controlling device comprising:
   a detector configured to detect a carbon dioxide concentration in air;
   an absorbing material (i) which absorbs carbon dioxide contained in the air, (ii) whose carbon dioxide absorption rate is controllable and (iii) which is capable of recovering an absorptivity of the carbon dioxide by releasing absorbed carbon dioxide;
   an absorption rate controller configured to control the carbon dioxide absorption rate of the absorbing material in accordance with the carbon dioxide concentration detected by the detector;
   a measuring section configured to measure a maximum value of the carbon dioxide absorption rate, which maximum value is obtained in a case where the absorption rate controller controls the carbon dioxide absorption rate to become the maximum value;
   a timing specifying section configured to specify, in accordance with the maximum value measured by the measuring section, a timing at which the absorbed carbon dioxide is released from the absorbing material; and
   a notifying section configured to notify a user of the timing specified by the timing specifying section.

2. The carbon dioxide concentration-controlling device according to claim 1,
   wherein the absorption rate controller includes a state controlling unit,
   when a carbon dioxide concentration detected by the detector is a first threshold or lower, the state controlling unit changes a state of the absorbing material to a state in which the absorption rate of the absorbing material is a lower-limit rate settable in the carbon dioxide concentration-controlling device, and
   when a carbon dioxide concentration detected by the detector is higher than the first threshold, the state controlling unit changes a state of the absorbing material to a state in which the absorption rate of the absorbing material is an absorption rate higher than the lower-limit rate.

3. The carbon dioxide concentration-controlling device according to claim 2,
   wherein when a carbon dioxide concentration detected by the detector is higher than the first threshold, the state controlling unit changes a state of the absorbing material to a state in which carbon dioxide is absorbed more quickly as a difference between the carbon dioxide concentration and the first threshold increases.

4. The carbon dioxide concentration-controlling device according to claim 2,
   when a carbon dioxide concentration detected by the detector is lower than a second threshold that is lower than the first threshold, the state controlling unit changes a state of the absorbing material to a state in which the absorbing material releases absorbed carbon dioxide.

5. The carbon dioxide concentration-controlling device according to claim 4,
   wherein when a carbon dioxide concentration detected by the detector is lower than or equal to the first threshold and higher than or equal to the second threshold, the state controlling unit changes a state of the absorbing material to a state in which the absorption rate of the absorbing material is the lower-limit rate settable in the carbon dioxide concentration-controlling device.

6. The carbon dioxide concentration-controlling device according to claim 1,
   wherein the absorbing material is an absorbing material that absorbs carbon dioxide at a rate corresponding to a temperature of the absorbing material, and
   the absorption rate controller is configured to control the absorption rate of the absorbing material by controlling the temperature of the absorbing material in accordance with a carbon dioxide concentration detected by the detector.

7. The carbon dioxide concentration-controlling device according to claim 1, wherein the absorbing material is a lithium composite oxide.

8. The carbon dioxide concentration-controlling device according to claim 7, wherein the absorbing material is a lithium composite oxide containing $Li_4SiO_4$ as a main component.

9. The carbon dioxide concentration-controlling device according to claim 1, further comprising a humidifying unit configured to humidify air in an ambient space of the absorbing material.

10. An electronic apparatus comprising the carbon dioxide concentration-controlling device according to claim 1.

* * * * *